US009462066B2

United States Patent
Song et al.

(10) Patent No.: US 9,462,066 B2
(45) Date of Patent: Oct. 4, 2016

(54) SOCIAL ACTION BY QUICK RESPONSE (QR) CODE

(75) Inventors: Sijia Song, Menlo Park, CA (US); Evan Ashton Stratford, San Francisco, CA (US); Alejandro Jose Marcu, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 220 days.

(21) Appl. No.: 13/590,972

(22) Filed: Aug. 21, 2012

(65) Prior Publication Data

US 2014/0059124 A1  Feb. 27, 2014

(51) Int. Cl.
| | | |
|---|---|---|
| G06F 15/16 | (2006.01) | |
| H04L 29/08 | (2006.01) | |
| G06Q 10/10 | (2012.01) | |
| G06Q 50/00 | (2012.01) | |

(52) U.S. Cl.
CPC .............. *H04L 67/22* (2013.01); *G06Q 10/10* (2013.01); *G06Q 50/01* (2013.01); *H04L 67/306* (2013.01)

(58) Field of Classification Search
CPC ..... H04L 67/22; H04L 67/306; H04L 51/10; H04L 67/10; H04L 9/3226; G06F 17/30867; G06F 17/30283; G06F 17/30864; G06Q 50/01; G06Q 30/0256; G06Q 20/32
USPC ......... 709/203-204, 206, 217; 705/75, 14.49
See application file for complete search history.

(56) References Cited

U.S. PATENT DOCUMENTS

| | | | |
|---|---|---|---|
| 8,746,554 B2* | 6/2014 | Gomez et al. ................ 235/380 |
| 8,818,909 B2* | 8/2014 | Bosworth et al. ............ 705/319 |
| 2011/0047182 A1* | 2/2011 | Shepherd et al. ............ 707/780 |
| 2011/0238755 A1* | 9/2011 | Khan et al. ................... 709/204 |
| 2011/0276396 A1* | 11/2011 | Rathod ........................ 705/14.49 |
| 2012/0202525 A1* | 8/2012 | Pettini ......................... 455/456.3 |
| 2012/0300087 A1* | 11/2012 | Shore et al. ................. 348/207.1 |
| 2012/0316948 A1* | 12/2012 | Shipley et al. .............. 705/14.23 |
| 2012/0324011 A1* | 12/2012 | Shepherd et al. ............ 709/204 |
| 2012/0324027 A1* | 12/2012 | Vaynblat et al. ............. 709/206 |
| 2013/0018957 A1* | 1/2013 | Parnaby et al. .............. 709/204 |
| 2013/0066967 A1* | 3/2013 | Alexander .................... 709/204 |
| 2013/0122934 A1* | 5/2013 | Branch et al. ............... 455/456.3 |
| 2013/0151419 A1* | 6/2013 | Hitchcock et al. ............. 705/75 |
| 2013/0218968 A1* | 8/2013 | McEvilly et al. ............ 709/204 |
| 2013/0226995 A1* | 8/2013 | Etheredge et al. ........... 709/203 |
| 2013/0334300 A1* | 12/2013 | Evans .......................... 235/375 |
| 2014/0012895 A1* | 1/2014 | Lieberman et al. ......... 709/203 |
| 2014/0040030 A1* | 2/2014 | Winters et al. .............. 705/14.58 |
| 2014/0045472 A1* | 2/2014 | Sharma et al. ............... 455/416 |

\* cited by examiner

*Primary Examiner* — Benjamin M Thieu (74) *Attorney, Agent, or Firm* — Baker Botts L.L.P.

(57) ABSTRACT

In one embodiment, a client device of a first user associated with a first node in a social graph of a social-networking system accesses a tag that encodes information regarding a second node in the social graph; determines based on the tag a social action to take one the social graph with respect to the first and second nodes; and transmits to the social-networking system a message configured to effect the social action on the social graph.

11 Claims, 5 Drawing Sheets

SOCIAL ACTION BY QUICK RESPONSE (QR) CODE

TECHNICAL FIELD

This disclosure generally relates to social graphs.

BACKGROUND

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

Quick Response (QR) code is a type of two-dimensional barcode. A character string (e.g., text, a Uniform Resource Locator (URL), a phone number, an address, and so on) can be encoded into a QR code. A copy of a QR code can be printed out and displayed in any suitable visual display (e.g., in a magazine page, on a bulletin board, on a package of a product, and so on). A copy of a QR code can also be displayed electronically, such as in a web page or an electronic concert ticket. A user of a device capable of capturing images (e.g., a camera phone) can use the device to scan a QR code. An application hosted by the device can decode the scanned QR code, and launch an action based on the character string decoded from the scanned QR code. For example, a user can use his smart phone to scan a QR code encoding a URL link. The smart phone than can bring up in its display a web page corresponding to the URL link.

DESCRIPTION OF EXAMPLE EMBODIMENTS

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various system, including the social-networking system. For example, the user may provide his name, profile picture, city of residence, contact information (e.g., a phone number, an email address), birth date, gender, marital status, family status, employment, education background, preferences, interests, and other demographic information to be included in the user node.

Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associate with the concept. For example and without limitation, information associated with a concept can include a name or a title, a description, one or more images (e.g., an image of cover page of a book), a web site (e.g., an Uniform Resource Locator or URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. The social-networking system may incorporate a selectable button (e.g., "add friend") in a first user's profile page. A second user can access the first user's profile page using a web browser hosted by the second user's client device and select the selectable button, causing the client device to transmit to the social-networking system a request to create an edge between a user node of the first user and another user node of the second user, indicating a friendship between the first user and the second user. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as status update, photo sharing, on-line calendars and events, instant messaging, and advertising. For example, a user may post a status update to a user's profile page (typically known as a wall post), which may be accessible to other users of the social-networking system (e.g., based on one or more privacy settings selected by the user). For example, the social-networking system may allow users to post photographs and other multimedia files (e.g., video clips) to a user's profile page or in a photo album, both of which may be accessible to other users of the social-networking system (e.g., based on one or privacy settings selected by the user). A photo (or a media file) may contain metadata (often called "tags") associated with the photo (e.g., time stamp, resolution). A user can also add metadata values to a photo, or tag a photo, during or after uploading the photo to the social-networking system. Some examples of the tags of a photo are author, title, location, or names of people appearing in the photo.

The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users. For example, the social-networking system may maintain an address book for a user. An address book may contain one or more contacts (e.g., a person or a business identify) and for each contact, contact information for the contact (e.g., a phone number, a user identifier for an instant messaging or IM service, an email address, a user identifier for a social-networking system, home address, or any suitable unique identifier of any suitable communication channel).

Figure 1:
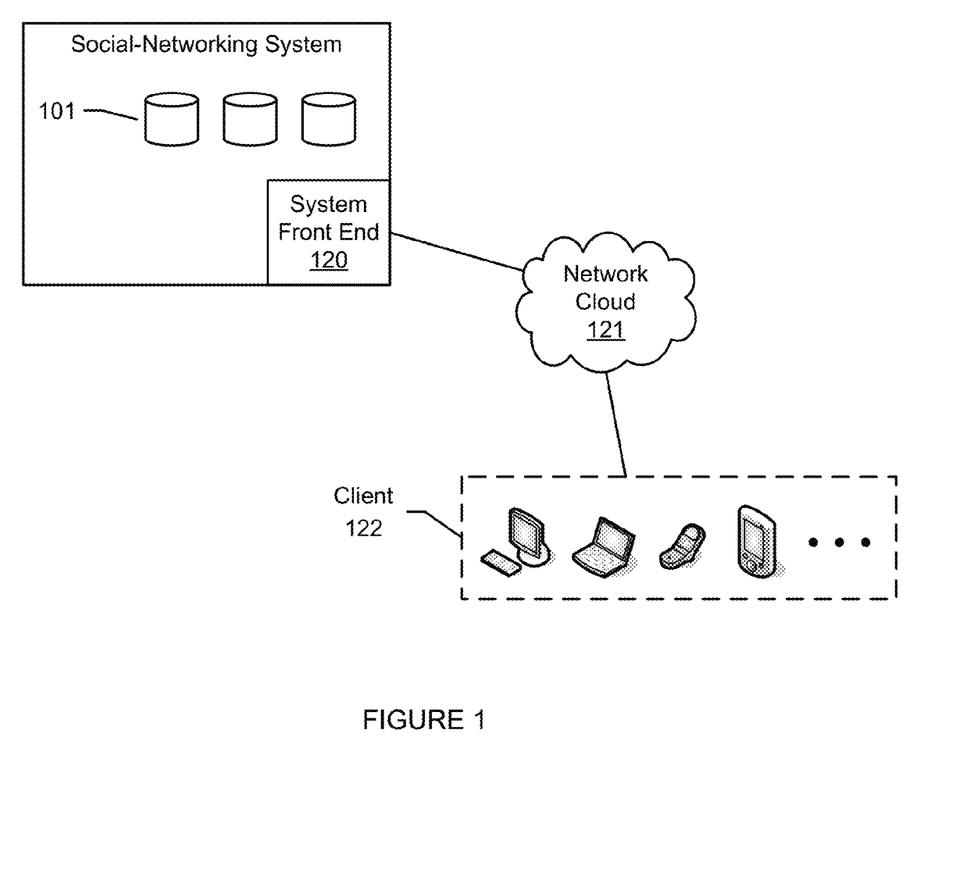
FIG. 1 illustrates an example network environment of a social-networking system.

FIG. 1 illustrates an example network environment of a social-networking system. In particular embodiments, a social-networking system may comprise one or more data stores 101. For example, each data store 101 may comprise one or more storage devices. In particular embodiments, the social-networking system may store in data stores 101 a social graph comprising user nodes, concept nodes, and edges between nodes as described earlier. Each user node may comprise one or more data objects corresponding to information associated with a user (e.g., a user identifier, a name). Each concept node may comprise one or more data objects corresponding to information associated with a concept (e.g., a user identifier, a name, a description). Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 101 may be operably connected to the social-networking system's front end 120. A user of the social-networking system may access the social-networking system using a client device such as client device 122. In particular embodiments, front end 120 may interact with client device 122 through network cloud 121. For example, front end 120 may be implemented in software programs hosted by one or more computing devices of the social-networking system. Front end 120 may include web or HTTP server functionality, as well as other functionality, to allow users to access the social-networking system.

Client device 122 may be a desktop computer, laptop computer, tablet computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social-networking system may store in data stores 101 data associated with applications and services provided by the social-networking system. For example, the social-networking system may store a user's post (e.g., a post identifier, a text string, and a time stamp) in data stores 101. The post may be stored in a particular node of a social graph, while the association between the post and a second user (e.g., the second user "likes" the post) may be stored in an edge connecting the particular node and a user node for the second user in the social graph. For another example, the social-networking system may store photos (or other media files) updated by a user in data stores 101. A photo may be stored in a particular node of a social graph, while a tag between the photo and a second user may be stored in an edge connecting the particular node and a user node for the second user in the social graph.

The social-networking system may also store links (or content) of web pages and applications in data stores 101. For example, the social-networking system may store information for a web page (e.g., an identifier, a name, an URL address, a description) in data stores 101. The information for the web page may be stored in a particular node of a social graph, while association between the web page and a second user (e.g., the second user "likes" the web page, or the second user "checks in" a place corresponding to the web page) may be stored in an edge connecting the particular node and a user node for the second user in the social graph. For another example, the social-networking system may store information for an application (e.g., an identifier, a name, a description, an URL link to the application, a description) in data stores 101. The information for the application may be stored in a particular node of a social graph, while association between the application and a second user (e.g., the second user "likes" the application, or the second user "subscribes" to the application) may be stored in an edge connecting the particular node and a user node for the second user in the social graph.

Figure 2:
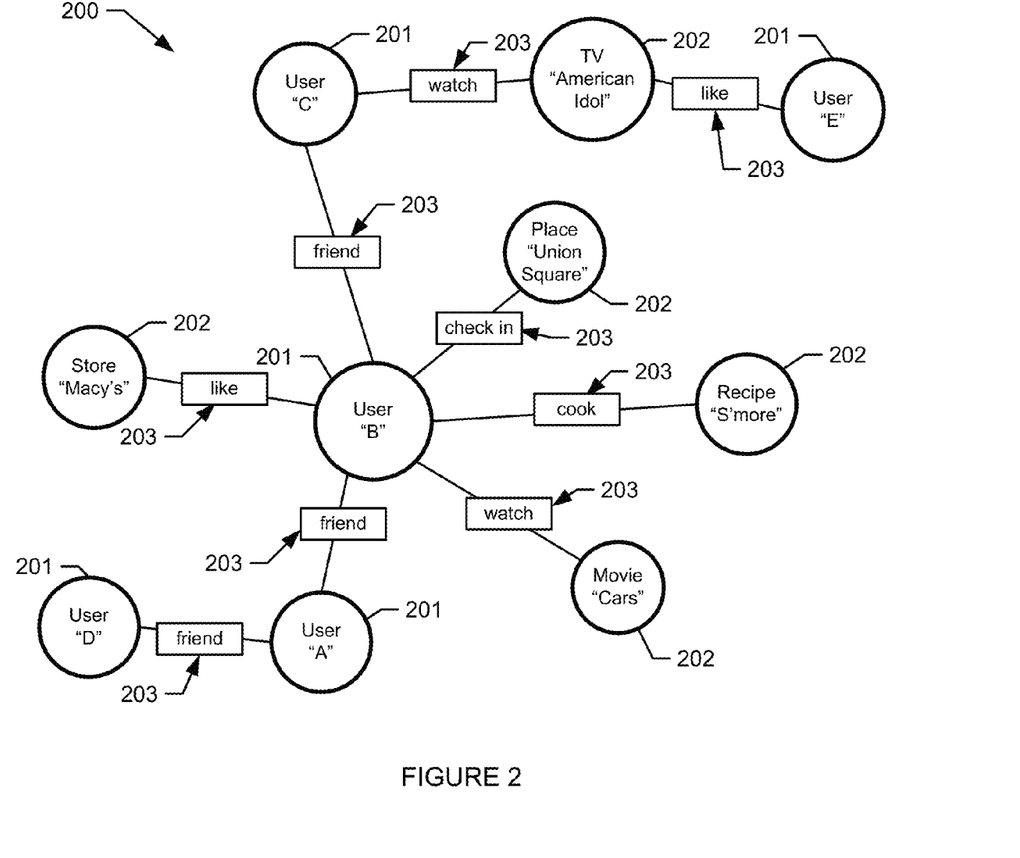
FIG. 2 illustrates an example social graph.

FIG. 2 illustrates an example social graph 200. In the example of FIG. 2, social graph 200 may include user nodes 201, concept nodes 202, and edges 203 between nodes. An edge 203 between a pair of nodes may represent a relationship (or an action) between the pair of nodes. For example, user "B" is a friend of user "A" and user "C", respectively, as illustrated by the edges between users nodes "B" and "A", and between users nodes "B" and "C." For example, users "C" watches TV show "American Idol", as illustrated by the edges between the "American Idol" concept node and user nodes "C." Similarly, the edge between the user node "B" and the concept node "Macy's" may indicate that user "B" likes "Macy's." The edge between user node "B" and the "Cars" concept node indicates that user "B" watches the movie "Cars." The edge between user node "B" and the "S'more" concept node indicates that user "B" cooks the recipe "S'more." The edge between user node "B" and the "Union Square" concept nodes indicates that user "B" checks in to "Union Square." The edge between user node "E" and the "American Idol" concept node indicates that user "E" likes TV show "American Idol." Note that a social graph can be much larger than social graph 200 illustrated in FIG. 2. For example, a social graph used by Facebook of Menlo Park, Calif. can have a number of nodes in the order of $10^8$, and a number of edges in the order of $10^{10}$.

As described earlier, a user may cause the social-networking system to create a social relationship or action (e.g., creating a "friend", "check in", or "like" edge in the social graph of the social-networking system) by selecting a selectable button or icon in a web page displayed in a web browser user interface. Particular embodiments describe methods for a user to create a social relationship or action with a concept or with another user in the social-networking system by scanning a QR code.

For example, the QR code may be displayed with a web page or a product associated with a concept of the social-networking system. The user may scan the QR code with a mobile device (e.g., a camera phone). Particular embodiments may automatically create a social action between the user and the concept in the social-networking system based on the QR code. For example, the user may scan a QR code displayed in the menu of a restaurant. Particular embodiments may, based on the QR code, automatically create a social action in the social-networking system indicating that the user checks in to the restaurant. For another example, the user may scan a QR code printed on the side of a cup of coffee that the user just purchased. Particular embodiments may, based on the QR code, automatically create a social action in the social-networking system indicating that the user enjoys the cup of coffee. As yet for another example, the user may scan a QR code displayed in the lower-right corner of the video of a TV show. Particular embodiments may, based on the QR code, automatically create a social action in the social-networking system indicating that the user watches the TV show. As yet for another example, the user may scan a QR code displayed on a rooftop of a business (the user may be on a helicopter ride or viewing a satellite image). Particular embodiments may, based on the QR code, automatically create a social-networking system in the social graph indicating that the user likes the business.

As for another example, a QR code may be displayed with a first user's profile page (or on the first user's outfit). A second user may scan the QR code with a mobile device. Particular embodiments may, based on the QR code, automatically create a social relationship in the social-networking system indicating that the second user is the first user's friend.

Figure 3:
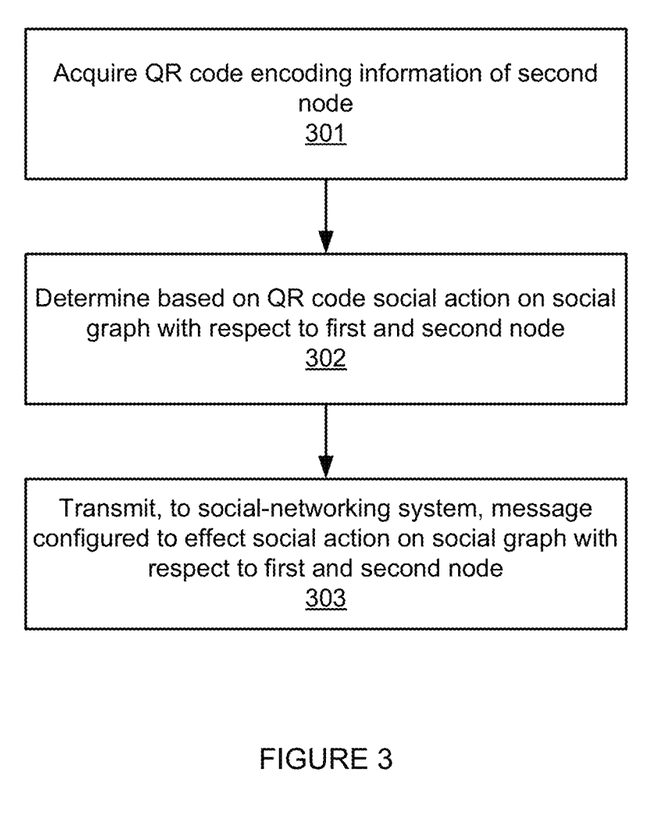
FIG. 3 illustrates an example method for effecting a social action by a QR code.

FIG. 3 illustrates an example method for effecting a social action by a QR code. The example method of FIG. 3 can be implemented by a client-side process (or application) hosted by a client device of a first user, and a server-side process hosted by one or more computing devices (e.g., servers) of the social-networking system. The client device may be a camera phone, a tablet computer, a smartphone, a point-of-sale (POS) system, or any suitable computing device that is configured to capture images of QR codes (e.g., by using its camera functionality). In particular embodiments, the first user may be associated with a first node (a user node or a concept node) in the social graph of the social-networking system. In particular embodiments, the client-side process may acquire a QR code that encodes information regarding a second node (a user node or a concept node) in the social graph (301).

Figure 4A:
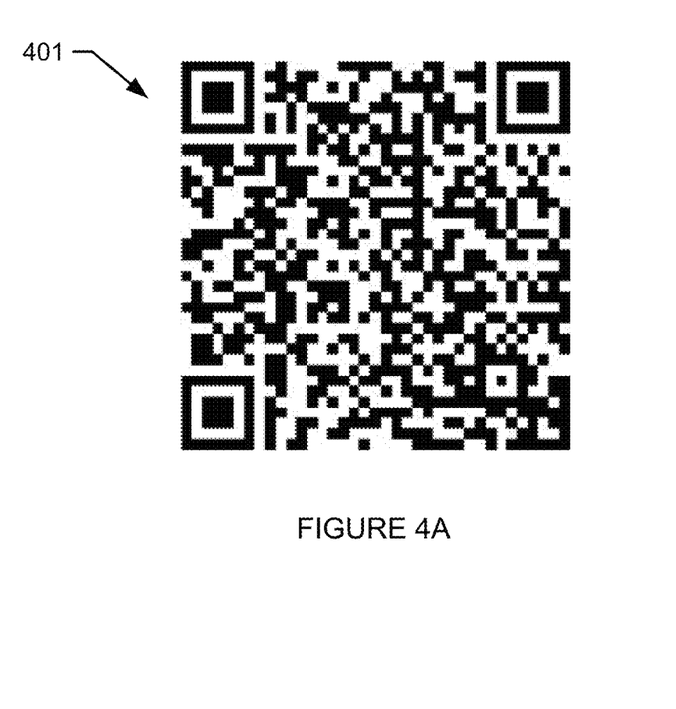
FIGS. 4A and 4B illustrate example QR codes.

FIG. 4A illustrates an example QR code 401. The example QR code 401 may encode an URL link (http://graph.facebook.com/me/food.enjoy?food=http://www.facebook.com/Frappuccino) comprising a social action (e.g., "enjoy") and a pointer to a web page (http://www.facebook.com/Frappuccino) corresponding to a second node (a concept node) for a product "Frappuccino." For example, the example QR code 401 may be printed at the side of a cup of drink ("Frappuccino") that the first user just purchased. The first user may use a camera function of his client device to capture an image of the example QR code 401. The client-side process may access the captured image of the example QR code 401 and decode the example QR code 401 (e.g., using a QR code decoding algorithm) to acquire the information regarding the second node (i.e., the URL link). Although the information regarding the second node (e.g., an URL link) may be encoded in a QR code such as the example QR code 401 illustrated in FIG. 4A, this disclosure contemplates any suitable methods for encoding information regarding the second node. For example and without limitation, particular embodiments may encode information regarding the second node with a Near Field Communication (NFC) tag, a radio-frequency identification (RFID) tag, or any suitable one- or two-dimensional barcode. For example, an NFC tag encoding information regarding a second node may be embedded in the menu of a restaurant or in the container of a cup of coffee as described earlier. The first user may use an NFC reader function of his client device to acquire a copy of the NFC tag encoding the information regarding the second node. A client-side process hosted by the first user's client device may access and decode the acquired copy of the NFC tag to acquire the information regarding the second node.

In particular embodiments, the client-side process may determine based at least in part on the QR code a social action to take on the social graph with respect to the first and second nodes (302). For example, the client-side process may inspect the URL link decoded from the example QR code 401 and determine a social action ("enjoy") related to the second node ("http://www.facebook.com/Frappuccino"). In some embodiments, the client-side process may determine a social action based on input from the first user. For example, the client-side process may construct a web page (or structured document) incorporating a selectable confirmation button (or icon) for the social action decoded from the QR code (e.g., "enjoy"), and display the web page in a web browser (or a user interface of a client application) displayed in the first user's client device's display. The first user may confirm the social action by selecting the confirmation button. In one embodiment, the client-side process may provide an input field in a web page (or structured document) presented to the first user. The first user may enter in the input field a desired social action (e.g., "crave") related to the second node. Yet in another embodiment, the client-side process may provide a plurality of social actions (e.g., "like", "drink", "have", "enjoy", "add friend") in a selectable field in a web page (or structured document) presented to the first user. The first user may select in the selectable field one social action regarding to the second node.

In particular embodiments, the client-side process may transmit to the social-networking system a message configured to effect the social action on the social graph with respect to the first and second nodes (303). The client-side process may transmit to the social-networking system a message comprising the determined social action and identifiers (or names, links to corresponding web page, and so on) of the first and second nodes, causing a server-side process of the social-networking system to create in the social graph an edge (corresponding to the determined social action) between the first and second nodes. For example, the server-side process may create in the social graph an edge "enjoy" between the first node (e.g., a user "John") and the second node (the product "Frappuccino"). The server-side process may generate a story "John enjoys Frappuccino" and add (post) the story to the first user's profile page.

Figure 4B:
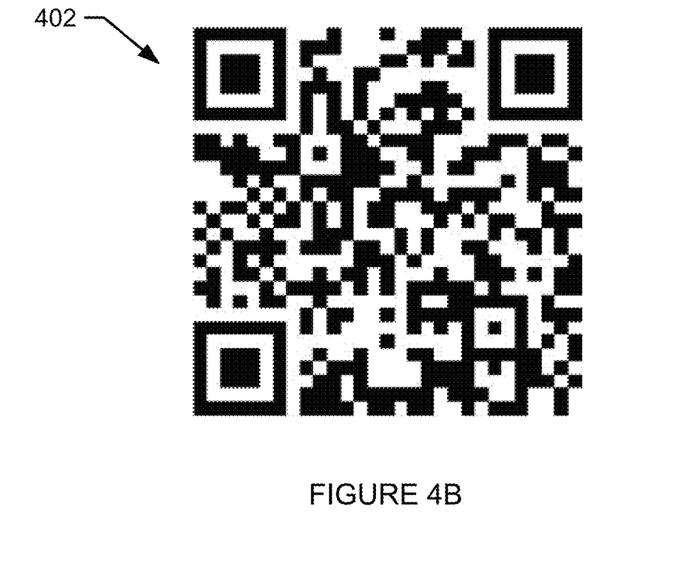

FIG. 4B illustrates another example QR code 402. Unlike the example QR code 401, the example QR code 402 does not encode a social action. The example QR code 402 may encode information regarding a second node in the social graph, such as an URL link (http://www.facebook.com/Frappuccino) for a web page corresponding to a second node (a concept node) for a product "Frappuccino." For example, the example QR code 402 may be printed at the side of a cup of drink ("Frappuccino") that the first user just purchased. The first user may use a camera function of his client device to capture an image of the example QR code 402. The client-side process may access the captured image of the example QR code 402 and decode the example QR code 402 (e.g., using a QR code decoding algorithm) to acquire the information regarding the second node (i.e., the URL link). In particular embodiments, the client-side process may determine a social action (which is not included in the example QR code 402) related to the first and second nodes based on the first user's input. For example, the client-side process may provide an input filed in a web page (or structured document) presented to the first user as described earlier. The first user may enter in the input field a desired action (e.g., "drink") related to the second node. For another example, the client-side process may provide a plurality of social actions in a selectable field in a web page (or structured document) presented to the first user as described earlier. The user may select in the selectable field one social action regarding to the second node. The client-side process may transmit to the social-networking system a message comprising the determined social action and identifiers (or names, links to corresponding web page, and so on) of the first and second nodes. A server-side process of the social-networking system may create in the social graph an edge (corresponding to the determined social action) between the first and second nodes.

In other embodiments, the client-side process may transmit to the social-networking system a message comprising identifiers (or names, links to corresponding web pages) of the first and second nodes. A server-side process of the social networking system may determine a social action between the first and second nodes based on node types of the first node or the second node. For example, the server-side process may determine a "friend" relationship between the first and second nodes if both nodes are user nodes, and create a "friend" edge between the first and second nodes. For example, the server-side process may create a "like" edge between the first and the second nodes if the second node corresponds to a business, an "enjoy" edge if the second node corresponds to a food product, or a "listen" edge if the second node corresponds to a music album. In one embodiment, the server-side process may determine a default social action (e.g., "like") if the second node is a concept node. The server-side process may create in the social graph an edge (corresponding to the determined social action) between the first and second nodes.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 5:
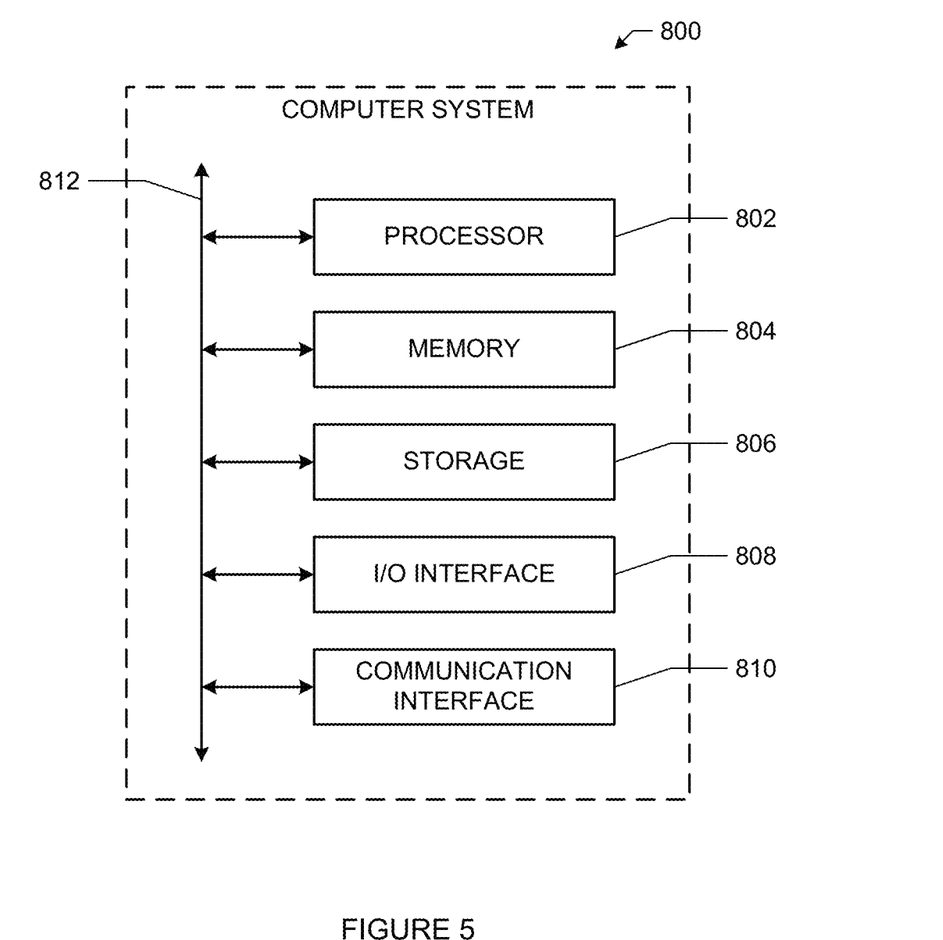
FIG. 5 illustrates an example computer system.

FIG. 5 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client device of a user associated with a user node in a social graph of a social-networking system:

accessing a tag that encodes information regarding a concept node in the social graph, the concept node representing a concept of the social-networking system;

determining based at least in part on the tag and a node type of the concept node one or more social actions to take on the social graph with respect to the user node and the concept node, wherein a list of default social actions based on the node type of the concept node as determined by the social-networking system is accessed to select a plurality of social actions related to the information of the tag regarding the concept node to determine the one or more social actions to take on the social graph;

displaying an interactive list comprising the one or more social actions determined based at least in part on the tag that encodes information regarding the concept node to the user for selection of a social action from the one or more social actions;

receiving user input comprising the selected social action from the interactive list; and transmitting, to one or more computer systems of a social-networking system maintaining at least a portion of the social graph, a message configured to effect the selected social action on the social graph with respect to the user node and the concept node, wherein the selected social action is determined based on the user input and on the tag, and wherein the selected social action comprises at least one of an action performed by the user on the concept or a relationship established between the user and the concept.

2. The method of claim 1, wherein the tag comprises a Quick Response (QR) code, a Near Field Communication (NFC) tag, or a radio-frequency identification (RFID) tag.

3. The method of claim 1, wherein:
the social graph comprises a plurality of nodes and a plurality of edges between the nodes, the nodes being associated with users or concepts, the edges connecting the nodes in the social graph; and
the selected social action comprises creating an edge between the user node and the concept node in the social graph.

4. A method comprising, by one or more computer systems of a social-networking system maintaining at least a portion of a social graph:
receiving, from a client device of a user associated with a user node in the social graph, a message configured to effect a social action on the social graph with respect to the user node and a concept node in the social graph, the concept node representing a concept of the social-networking system,
the client device having determined the social action based at least in part on a tag and a node type of the concept node accessed by the client device,
the tag encoding information regarding the concept node comprises a list of default social actions based on the node type of the concept node as determined by the social-networking system, the tag encoding information being accessed to select a plurality of social actions related to the information of the tag regarding the concept node to determine the one or more social actions to take on the social graph, and
the social action being selected based on a received user input which comprises the one or more social actions determined based at least in part on the tag that encodes information regarding the concept node,
wherein the social action being selected comprises one of: an interactive list or a user input;
wherein the selected social action comprises at least one of an action performed by the user on the concept or a relationship established between the user and the concept; and in response to the message, effecting the selected social action on the social graph with respect to the user node and the concept node.

5. The method of claim 4, wherein the tag comprises a Quick Response (QR) code, a Near Field Communication (NFC) tag, or a radio-frequency identification (RFID) tag.

6. A client device of a user associated with a user node in a social graph of a social-networking system, the client device comprising:
one or more processors; and
one or more computer-readable non-transitory storage media coupled to the processors and embodying software that is operable when executed by the processors to:
access a tag that encodes information regarding a concept node in the social graph, the concept node representing a concept of the social-networking system;
determine based at least in part on the tag and a node type of the concept node one or more social actions to take on the social graph with respect to the user node and the concept node, wherein a list of default social actions based on the node type of the concept node as determined by the social-networking system is accessed to select a plurality of social actions related to the information of the tag regarding the concept node to determine the one or more social actions to take on the social graph;
display an interactive list comprising the one or more social actions determined based at least in part on the tag that encodes information regarding the concept node to the user for selection of a social action from the one or more social actions;
receive user input comprising the selected social action from the interactive list; and
transmit, to one or more computer systems of a social-networking system maintaining at least a portion of the social graph, a message configured to effect the selected social action on the social graph with respect to the user node and the concept node,
wherein the selected social action is determined based on the user input and on the tad, and
wherein the selected social action comprises at least one of an action performed by the user on the concept or a relationship established between the user and the concept.

7. The client device of claim 6, wherein the tag comprises a Quick Response (QR) code, a Near Field Communication (NFC) tag, or a radio-frequency identification (RFID) tag.

8. The client device of claim 6, wherein the selected social action is determined based on the user input and on the tag.

9. The client device of claim 6, wherein:
the social graph comprises a plurality of nodes and a plurality of edges between the nodes, the nodes being associated with users or concepts, the edges connecting the nodes in the social graph; and
the selected social action comprises creating an edge between the user node and the concept node in the social graph.

10. One or more computer-readable non-transitory storage media embodying software that is operable when executed to:
maintain at least a portion of a social graph of a social-networking system;
receive, from a client device of a user associated with a user node in the social graph, a message configured to effect a social action on the social graph with respect to the user node and a concept node in the social graph, the concept node representing a concept of the social-networking system, the client device having determined the social action based at least in part on a tag and a node type of the concept node accessed by the client device, the tag encoding information regarding the concept node comprises a list of default social actions based on the node type of the concept node as determined by the social-networking system, the tag encoding information being accessed to select a plurality of social actions related to the information of the tag regarding the concept node to determine the one or more social actions to take on the social graph, and the social action being selected based on a received user input which comprises the one or more social actions determined based at least in part on the tag that encodes information regarding the concept node, wherein the social action being selected comprises one of: an interactive list or a user input;

wherein the selected social action comprises at least one of an action performed by the user on the concept or a relationship established between the user and the concept; and in response to the message, effect the selected social action on the social graph with respect to the user node and the concept node.

11. The media of claim 10, wherein the tag comprises a Quick Response (QR) code, a Near Field Communication (NFC) tag, or a radio-frequency identification (RFID) tag.

* * * * *